May 29, 1951  D. F. BISSELL ET AL  2,554,555
ELECTRICALLY CONTROLLED CUTOFF DEVICE FOR TUBING
Filed April 16, 1947  4 Sheets-Sheet 1
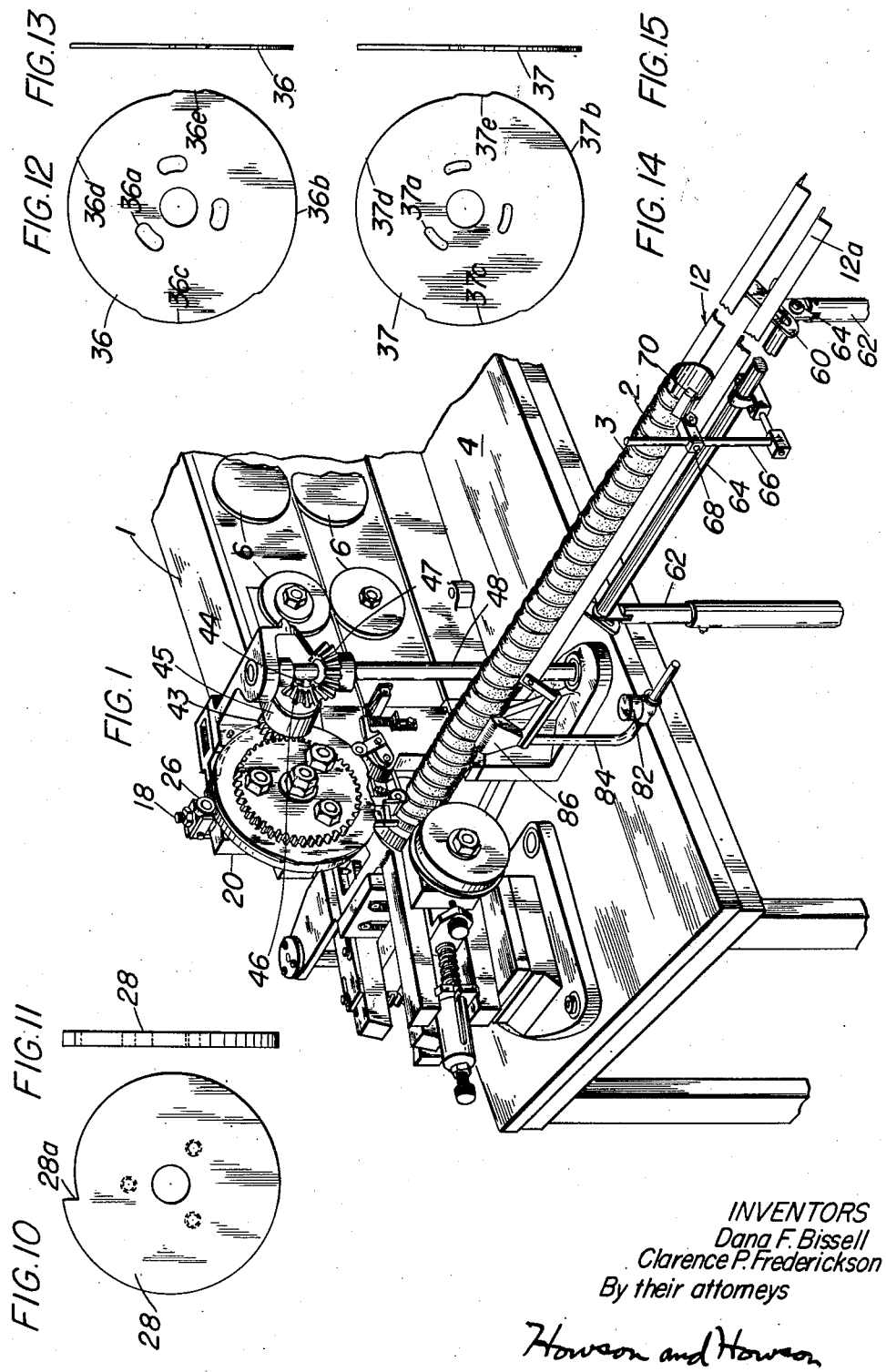
INVENTORS
Dana F. Bissell
Clarence P. Frederickson
By their attorneys
Howson and Howson May 29, 1951 D. F. BISSELL ET AL 2,554,555
ELECTRICALLY CONTROLLED CUTOFF DEVICE FOR TUBING
Filed April 16, 1947 4 Sheets-Sheet 2
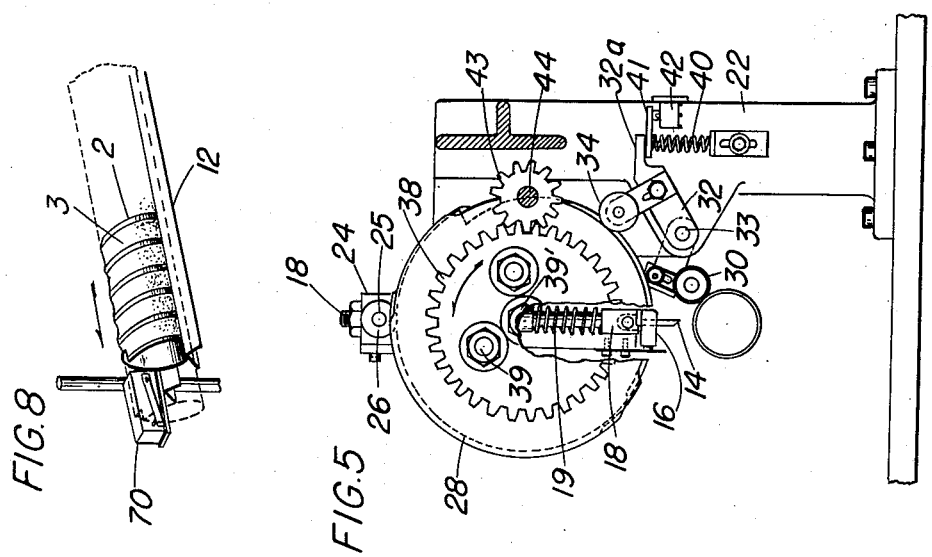
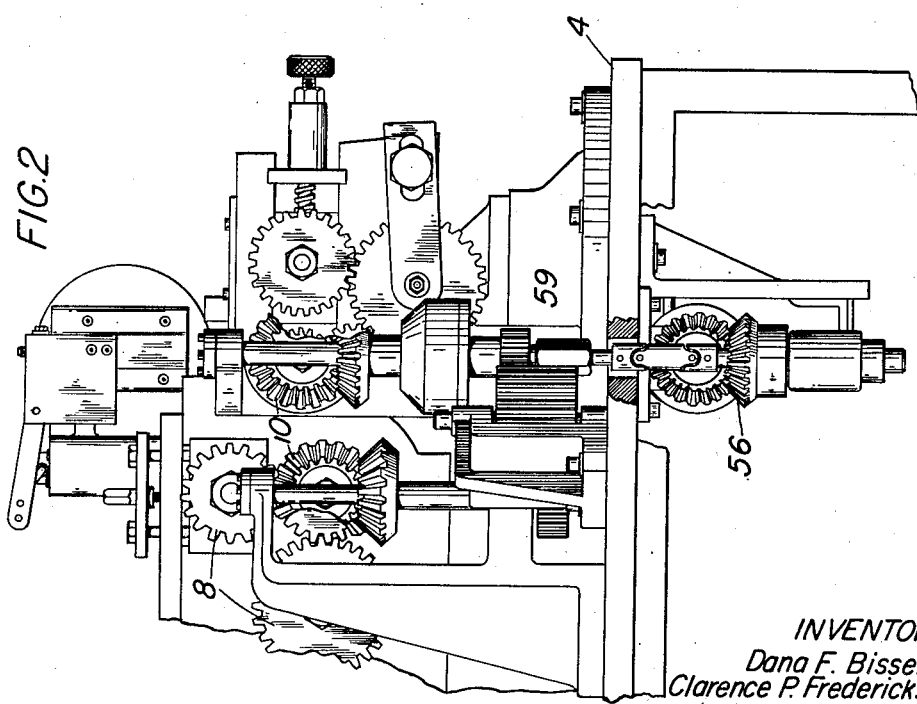
INVENTORS
Dana F. Bissell
Clarence P. Frederickson
By their attorneys
Howson and Howson

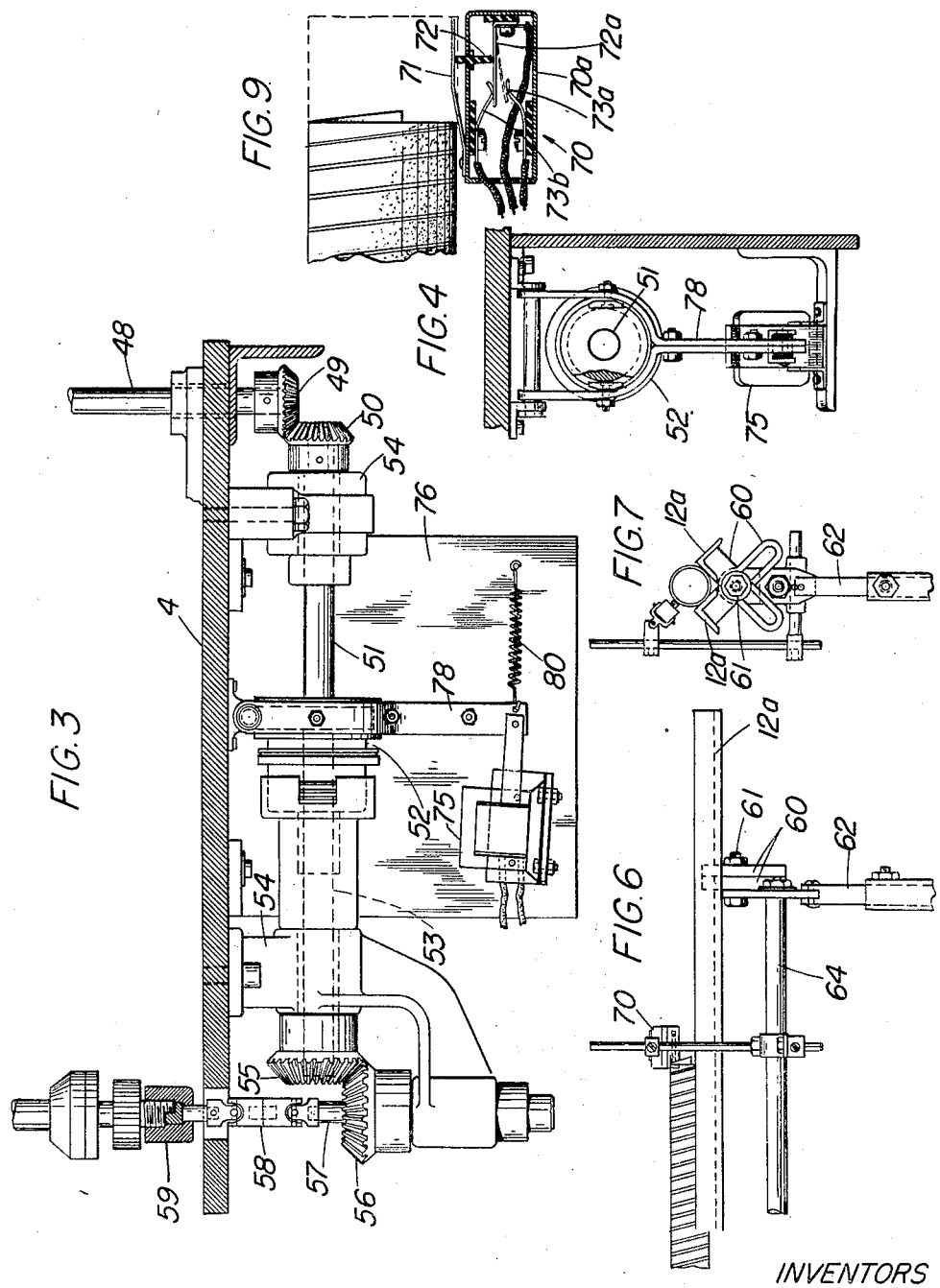

May 29, 1951  D. F. BISSELL ET AL  2,554,555
ELECTRICALLY CONTROLLED CUTOFF DEVICE FOR TUBING
Filed April 16, 1947  4 Sheets-Sheet 4

INVENTORS
Dana F. Bissell
Clarence P. Frederickson
By their attorneys

Howson and Howson

Patented May 29, 1951

2,554,555

UNITED STATES PATENT OFFICE 2,554,555

ELECTRICALLY CONTROLLED CUTOFF DEVICE FOR TUBING

Dana F. Bissell, Plantsville, and Clarence P. Frederickson, West Hartford, Conn., assignors to The Wiremold Company, Hartford, Conn., a corporation of Connecticut Application April 16, 1947, Serial No. 741,928

11 Claims. (Cl. 164—49)

This invention relates to devices for cutting tubing and more particularly for cutting spirally-wound tubing made from strips of metal and flexible material. It is an object of this invention to provide a cut-off device of improved construction for cutting into sections continuously made collapsible tubing formed from strips of metal and flexible material of uniform length. It is a further object of this invention to provide an electrically controlled cut-off device of the type described which may be readily adjusted to change the length of the tube sections cut off.

Other objects and advantages of the invention will become apparent as it is described in connection with the accompanying drawings.

In the drawings,

Fig. 1 is a perspective view of a cut-off device in accordance with this invention applied to a machine for making tubing in continuous lengths, the electrical circuits for the cut-off device being omitted and only such parts of the tube forming machine being shown as are necessary for an understanding of the invention;

Fig. 2 is a fragmentary view in side elevation of structure shown in Fig. 1 showing the connection of the drive mechanism for the cut-off device to the driving mechanism of the tube forming machine;

Fig. 3 is a fragmentary sectional view of the structure of Fig. 1 showing only the drive mechanism for the cut-off device as it extends from one side to the other beneath the bed plate of the tube forming machine;

Fig. 4 is a view in side elevation of the clutch operating means of Fig. 3.

Fig. 5 is a view in front elevation of the cut-off device shown detached from the tube forming machine, parts being broken away to show other parts more clearly;

Fig. 6 is a partial view in elevation of the trough to which the tube is discharged from the tube forming machine;

Fig. 7 is a view in end elevation of the trough of Fig. 6;

Fig. 8 is a perspective view showing the manner of operating the controlling switch for the cut-off device by the tube as it is formed;

Fig. 9 is a plan view, drawn to a larger scale, showing the relation of the tube to the controlling switch, part of the switch casing being removed;

Figs. 10 and 11 are front and side elevation, respectively, of the cam controlling the cut-off means for the metal of the tubing;

Figs. 12 and 13 are front and side elevation, respectively, of one of the pair of cams controlling the cut-off means for the fabric of the tube;

Figure 16:
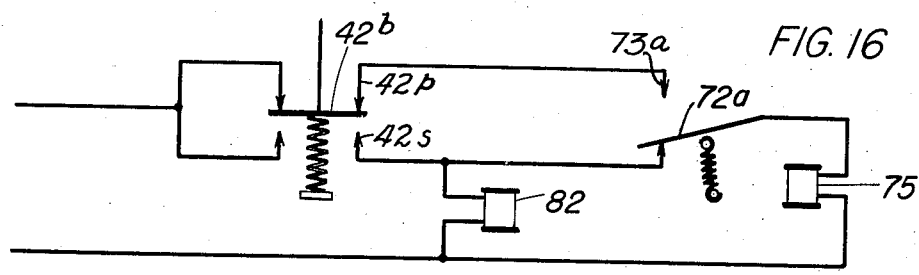

Figs. 14 and 15 are views similar to Figs. 12 and 13, respectively, of the other cam of the pair; and Figs. 16, 17, 18, and 19 are circuit diagrams showing various conditions of the electrical circuit controlling the cut-off device.

In the drawings, the invention is shown in connection with the machine 1 for forming tubing from a spirally wound metal strip 2 engaged with opposite edges of a fabric or other flexible strip 3. The machine 1 is mounted on a bed plate 4 and comprises rolls 6 which shape the metal strip and secure an edge of the metal strip to the fabric strip. The rolls 6 are operated by suitable gearing 8. Gearing 10, driven from the gearing 8, rotates a mandrel, not shown, about which the strips are formed into a tube, in a known manner which is not per se a part of this invention and therefore need not be detailed. The formation of the tube causes the length of the tube to be forced outwardly along a trough 12 formed by a pair of parallel inverted angle irons as hereinafter more fully described.

To sever the tube it is necessary to cut the metallic spiral element 2 and also to cut the flexible or fabric element 3. By the means fully described below the fabric is cut spirally around the circumference of the tube and the metal is cut longitudinally parallel to the tube axis. The longitudinal cut necessarily intersects the peripheral cut at the start and finish of one convolution.

To cut the metallic element there is provided a chisel cutter 14, Fig. 5, secured in a holder 16 which is pivotally mounted at the lower end of a vertically movable rod 18, the rod 18 being mounted in casing 20. To press the rod 18 downwardly and cause the cutter 14 to sever the metal strip of the tubing, a spring 19 is confined between a shoulder on the rod 18 and the upper end of a recess in the casing 20. The casing 20 is suitably supported on a bracket 22 carried by the bed plate 4. Secured to the upper end of the rod 18 is a collar 24 carrying a pin 25 on which is journaled a roller 26 positioned to bear upon a rotary disc cam 28.

The cam 28 is formed with a depression as at 28a which, when it passes beneath the roller 26, permits the spring to operate the cutter 14 to sever the metal strip of the tube. Due to the pivotal mounting of the cutter holder 16, the cutter 14 pivots with the rotation of the tube during the formation thereof and does not interfere with such rotation i. e., with the continuous formation of the tube. Rotation of the cam 28 beyond the depression 28a brings the roller 26 to its normal elevation and withdraws the cutter 14 from its position in engagement with the tube.

To cut the fabric of the tube there is provided a circular cutter 30 adjustably mounted on one end of a bell crank lever 32 which is pivotally mounted at 33 on the bracket 22. To the other end of the bell crank lever 32 there is adjustably secured a roller 34 positioned to engage the plurality of rotary disc cams 36 and 37. The cams 28, 36 and 37 are secured by bolts 39 to a gear 38 rotatively mounted on a stub shaft 39′ fixed in the casing 20. The cams 36 and 37 are similar in shape and are provided with elongated openings as at 36a and 37a, respectively, to receive the bolts 39 so that the cam surfaces may be relatively shifted. The cam surfaces are formed with a circular portion of greatest radius as at 36b and 37b, respectively, with short circular portions of slightly less radius than the portions 36b and 37b, as at 36c and 37c. Portions 36d and 37d of less radius than the portions 36c and 37c extend from the portions 36c and 37c to portions 36e and 37e, respectively, which are of the same radius as the portions 36c and 37c, respectively. The radii of the similar portions of the cams are the same and the radii are of such dimension that the roll 34 when in engagement with cam portions 36b and 37b will hold the cutter 30 from engagement with the tube. When the portions 36c and 37c pass beneath the roll 34, the cutter 30 is lowered but not so as to engage the tubing. In this position of the roll, the extension 32a of the bell crank 32 permits the spring 40 to lift a switch control arm 41 and change the position of the contacts of a switch 42 as will be fully explained hereinafter. When the cams move so as to place the portions 36d and 37d beneath the roll 34, the spring 40 presses the cutter 30 into engagement with the fabric of the tube causing the cutter 30 to sever the fabric against the mandrel but no further change is made in the contacts of the switch 42 at this time. When the cam portions 36e and 37e pass beneath the roll 34 the bell crank 32 is operated to lift the cutter 30 from the fabric. The movement of the portions 36b and 37b past the roller 34 raises the cutter 30 further and engagement of the extension 32a with the member 41 operates the contacts of the switch 42 at this time. The elongated openings 36a and 37a permit relative adjustment of the positions of the various depressed portions of the cams so as to accurately determine the time during which the cutter 30 engages the fabric of the tube, such adjustment being made so that cutter 30 cuts the fabric of the tube for one complete revolution of the tube. The position of the depression 28a with respect to the depressions 36d, 37d, and 36e, 37e when the cams are assembled with the gear 38 is such that the depression 28a passes beneath the roll 26 immediately upon completion of the cutting of the fabric so that the metal portion of the tube is severed immediately after the severing of the fabric, thus completing the severance of the section of the tube.

To operate the cams 28, 36 and 37, the gear 38 is driven by a pinion 43 fixed on a shaft 44 journaled in a box 45 secured to the bracket 22. On the opposite end of the shaft 44 is fixed a beveled gear 46 which meshes with a beveled gear 47 fixed on a vertically arranged shaft 48 journaled in the bracket 22 and projecting beneath the bed plate 4. To the lower end of the shaft 48 is fixed a beveled gear 49 which meshes with a beveled gear 50 fixed on a shaft 51 driven through clutch 52 from a shaft 53, the shafts 51 and 53 being journaled in brackets 54 secured under the bed plate 4. The shaft 53 has fixed thereon a gear 55 which meshes with a gear 56 fixed on a vertically arranged shaft 57 journaled in an extension of one of the brackets 54 and connected through a universal coupling 58 and nut 59 to the lower end of a shaft of the gearing 10 which drives the mandrel. Driving the cams which control the cutting mechanism from the driving mechanism for the mandrel permits of arranging the operation of the cutting mechanism to be independent of the diameter to the tubing. That is, the cams controlling the roll 34 are adjusted so that the cutter 30 engages the fabric during one revolution of the mandrel and such adjustment will obtain irrespective of the diameter of the tube formed.

The trough 12, upon which the tube rests as it is delivered from the mandrel, comprises angles 12a secured to slotted cross members 60 adjustably secured in position by the bolts 61 which secure the cross members to the adjustable standards 62 carried upon the floor or other suitable support. The standards 62 are spaced by a member 64 on which is adjustably mounted a bracket 66.

The bracket 66 has adjustably mounted thereon a bracket 68 carrying an electric switch 70 positioned so as to have the operating member thereof engaged by the tube as it is forced along the trough 12. As shown in Fig. 9, such a switch may comprise a casing 70a having a spring operating member 71 engaging a plunger 72 which engages contact 72a. The spring member 71 normally permits the contact 72a to engage with the contact 73b but when engaged by the end of the tube, the spring member 71 is operated to interrupt the contact between contacts 72a and 73b and engage contact 72a with contact 73a. When the tube is removed from the trough, the spring 71 is released from the pressure of the tube and permits the return of the contact 72a to engage the contact 73b. The bracket 66, being adjustable on the member 64, permits of the shifting of the switch 70 so as to have the spring member 71 operated when the desired length of tubing has been formed. The switch 42 operated by the extension 32a of the bell crank lever 32 may be similar in construction to the switch 70, it being sufficient that various contacts are made in the different positions of the switch. To that end switch 42 may have its movable contact bridge different pairs of stationary contacts as shown in Figures 16 to 19 in different switch positions.

In order to easily identify the circuits and describe their functioning and operation, one set 42f of contacts of the switch 42 may be considered as primary contacts and the other set (42s) as secondary contacts. The sets are alternately bridged by the movable contact 42p. The primary contacts are in circuit with the contacts 73a of the switch 70; and the secondary contacts are in circuit with the contacts 73b of switch 70 while the movable contact 72a is connected with the solenoid 75 which in turn is connected with the power line. The solenoid 75 is supported from a member 76 secured to the bed plate 4 and having its armature connected to a yoke 78 arranged to operate the clutch 52. When the solenoid 75 is energized, the clutch 52 is engaged and the cams 28, 36 and 37 are operated; and when the solenoid 75 is deenergized the spring 80 shifts the yoke 78 to release the clutch 52 and permit the cams to remain at rest.

Secondary contacts 42s of switch 42 are in circuit with the contacts 73b. Hence the solenoid 75 can be energized when either the primary branch circuit, (including contacts 42p and 73a, 72a) is closed, or when the secondary branch (including contacts 42s and 73b, 72a) is closed. In the circuit controlled by the secondary contacts of switch 42 is a solenoid operated valve 82 in an air-line 84 arranged to supply air under pressure from a suitable source of supply to a nozzle 86 arranged to direct the jet against the severed section of the tube resting in the trough and remove the section of the tube from the trough. The circuit through the air control solenoid 82 is completed when the secondary contacts 42s are closed.

Figure 17:
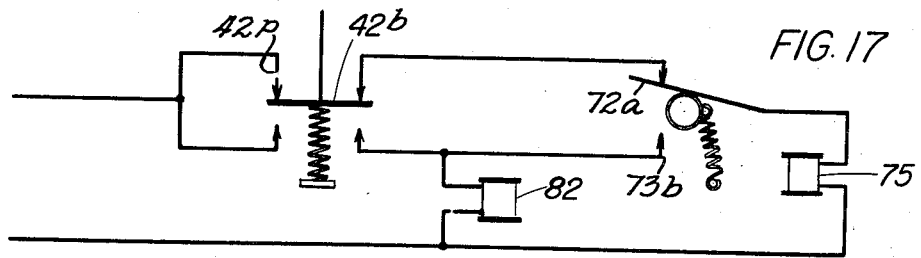
Figure 18:
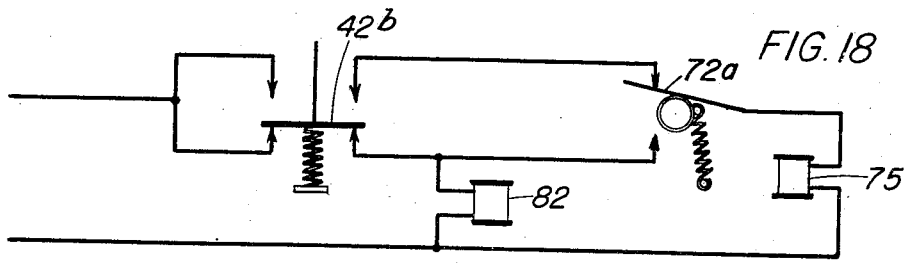
Figure 19:
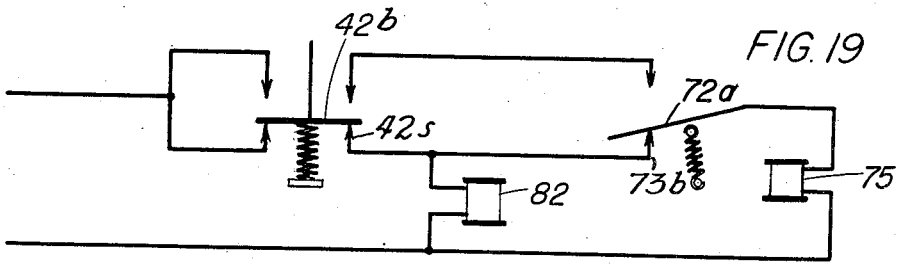

During the making of all but the last convolution of a tube, the cams are stationary and have their portions 36c and 37c engaged with roll 34 so that switch 42 is operated by its spring 40 to close the primary contacts 42p. Switch 70 is not yet acted upon by the tube and is held closed by its spring. Hence the switch is open as shown in Fig. 16. The tube, upon attaining the desired length, operates switch 70 as shown in Fig. 17, completing the primary circuit which energizes solenoid 75, operating the clutch 52 and starting operation of the cams 28, 36 and 37. Operation of the cams bring portions 36d and 37d to roll 34, causing the knife 30 to engage and cut the fabric. With roll 34 on the lowest cam portions 36d and 37d, the position of switch 42 is not changed and the cams continue operation during one complete revolution of the tube. Upon completion of the cutting of the fabric, the circular cutter is lifted from the fabric by the roll 34 riding up on the cam portions 36e and 37e. At the same time the depression 28a in the cam 28 is brought beneath the roll 26 so that the chisel cutter is operated to cut the metal strip. Then while the switch 70 remains unaffected roller 34 rides on cam portions 36b, 37b shifting switch 42 to close its secondary contacts and open its primary contacts as shown in Fig. 18. This de-energizes solenoid 75 disengaging the clutch 52 and, stopping operation of the cams 28, 36 and 37 and energizes solenoid valve 82, operating the valve to supply air pressure to remove the severed tube section from the trough. Removal of the tube section permits the switch 70 to return to de-activated position and complete the secondary circuit for solenoid 75, as shown in Fig. 19. Completing this circuit, recloses the clutch and causes operation of the cams 28, 36 and 37 which operate until roll 34 engages cam portions 36c, 37c, restoring switch 42 to initial position opening the secondary circuit contacts 42s and interrupting the circuit to the solenoids 75 and 82 as shown in Fig. 16, thus stopping operation of the cams and closing the air valve. Meanwhile, another section of the tube is being formed and the parts retain the positions indicated in Fig. 16 until the tube engages the switch 70 whereupon the cycle is repeated.

Although tubing having a fabric strip has been mentioned to simplify explanation of the invention it will be apparent to those skilled in the art that the invention is applicable to tubing made of strips of other flexible materials beside fabric.

Many modifications within the scope of the invention will be apparent to those skilled in the art. Therefore the invention is not limited to the specific embodiment described and illustrated.

What is claimed is:

1. The combination with a machine forming a tube of united spirals of metal and of flexible material, of a cut-off device having separate cutting means, means operating said cut-off device from said tube forming machine for cutting first the flexible portion of said tube and then said metallic portion, and means operated by said tube for controlling the operation of said cutting means.

2. The combination with a machine forming a tube of united spirals of metallic and of flexible material, of a cut-off device having separate cutting means for the metal and for the flexible material, a rotatable cam controlling said metal cutting means, a plurality of rotatable relatively adjustable cams controlling the other cutting means, means for rotating said cams from said machine, means operated by said formed tube controlling the operation of said cutting means, and means operated by said relatively adjustable cams cooperating with said tube operated means in controlling the operations of said cams.

3. The combination with a machine forming a tube of united spirals of metal and of flexible material, of a cut-off device having separate cutting means for the metal and for the flexible material, rotatable cam means controlling said cutting means, means for rotating said cam means from the machine, means operated by said formed tube controlling the operation of said cutting means, and means operated by said cam means cooperating with said tube cutting means in controlling the operation of said cam means.

4. The combination with a machine forming a tube of united spirals of metal and of flexible materials of a cut-off device having separate cutting means for the metal and for the flexible material, rotatable cam means controlling said cutting means, means for rotating said cam means from the machine, means operated by said formed tube controlling the operation of said cutting means, and means controlled by said cam means for removing severed tube sections.

5. The combination with a tube forming machine of a cut-off device for formed tube lengths comprising rotatable cam means, means for rotating said cam means from the machine, cutting means operable during cutting without movement lengthwise of the tube, means operated by said formed tube for initiating the operation of said cut-off device, and means controlled by said cam means and separate from the cut-off starting means for stopping the operation of said cut-off device.

6. The combination with a tube forming machine of a cut-off device comprising rotatable cam means, means for rotating said cam means from the machine, means operated by the formed tube for initiating the operation of said cut-off device, and means operated by said cam means for controlling the stopping of said cam means and the removal of the severed tube section from the machine, said tube operated means initiating the return of said cam means to its initial position upon removal of the severed tube sections.

7. The combination with a tube forming machine of a cut-off device comprising rotatable cam means, means for rotating said cam means from the machine, means operated by the formed tube for initiating the operation of said cut-off device, and means operated by said cam means for controlling the stopping of the cutting operation and the removal of the severed tube section, said tube operated means initiating the return of said cam means to its initial position upon removal of the severed tube section, and said cam operated means cooperating with said tube operated means to stop rotation of said cam means in its initial position.

8. The combination with a tube forming machine of a cut-off device comprising rotatable cam means, means for rotating said cam means from the machine, electrical means controlled by the formed tube for initiating the operation of said cut-off device, and electrical means controlled by said cam means for stopping said cut-off device and removing the severed tube section, said tube controlled means initiating the return of said cut-off device to its initial position upon removal of the severed tube section, and said cam controlled means stopping said cut-off device in its initial position.

9. A device for severing continuously formed rotating tubing comprised of a metallic spiral between the convolutions of which is flexible material, said device comprising mechanism to sever the metallic spiral, mechanism coordinated with said severing mechanism to cut the flexible material while said tubing is rotating, clutch means operable to make active said severing and cutting mechanisms, means operated by a desired length of tube to engage said clutch means, and means operated by said cutting mechanism to disengage said clutch means and deactivate said cutting and severing means.

10. A device for severing continuously formed rotating tubing comprised of a metallic spiral between the convolutions of which is flexible material, said device comprising mechanism to sever the metallic spiral, mechanism coordinated with said severing mechanism to cut the flexible material while said tubing is rotating, normally inactive driving means for said severing and cutting mechanisms, electrical means operated by a desired length of tube to make active said driving means, and electrical means operated by said driving means to de-activate said driving means.

11. In combination with a machine forming tubing comprised of a metallic spiral between the convolutions of which is flexible material, a cut-off device comprising peripheral cutting means operable to cut the flexible material without movement lengthwise of the tube by said cutting means during the cutting, rotatable cam means, means for rotating said cam means from the machine, means operated by said formed tube for initiating the operation of said cut-off device, and means controlled by said cam means and separate from the cut-off starting means for stopping the operation of said cut-off device.

DANA F. BISSELL.
CLARENCE P. FREDERICKSON.

REFERENCES CITED

The following references are of record in the file of this patent:

UNITED STATES PATENTS

| Number | Name | Date |
|---|---|---|
| Re. 22,114 | Borzym | June 16, 1942 |
| 1,325,173 | Shirlow et al. | Dec. 16, 1919 |
| 1,493,763 | Maston | May 13, 1924 |
| 1,643,994 | Parsons | Oct. 4, 1927 |
| 1,698,250 | Adams | Jan. 8, 1929 |
| 1,709,369 | Ostrander | Apr. 16, 1929 |